(12) United States Patent
Fonarov

(10) Patent No.: US 11,667,345 B1
(45) Date of Patent: Jun. 6, 2023

(54) SCHOOL CHILDREN RESCUE VEHICLE

(71) Applicant: Leonard Fonarov, Hollywood, FL (US)

(72) Inventor: Leonard Fonarov, Hollywood, FL (US)

(*) Notice: Subject to any disclaimer, the term of this patent is extended or adjusted under 35 U.S.C. 154(b) by 0 days.

(21) Appl. No.: 18/088,815

(22) Filed: Dec. 27, 2022

Related U.S. Application Data

(60) Provisional application No. 63/319,395, filed on Mar. 14, 2022.

(51) Int. Cl.
*F41H 7/04* (2006.01)
*B62J 23/00* (2006.01)
*B62J 3/10* (2020.01)
*B62K 3/00* (2006.01)
*B62J 6/00* (2020.01)

(52) U.S. Cl.
CPC ............... *B62J 23/00* (2013.01); *B62J 3/10* (2020.02); *B62J 6/00* (2013.01); *B62K 3/002* (2013.01); *F41H 7/04* (2013.01)

(58) Field of Classification Search
CPC .......................................................... F41H 7/04
USPC ..................................................... 296/187.07
See application file for complete search history.

(56) References Cited

U.S. PATENT DOCUMENTS

| | | | | |
|---|---|---|---|---|
| 1,915,886 A | * | 6/1933 | Garcia Gutierrez . | B60K 7/0007 180/209 |
| 2,107,766 A | * | 2/1938 | Rose ........................ | B62K 1/00 180/10 |
| 3,478,643 A | * | 11/1969 | Forsyth ..................... | F41H 7/04 89/36.08 |
| 3,917,270 A | * | 11/1975 | Gothard, Jr. ............... | F41J 9/02 273/DIG. 7 |
| 4,386,787 A | * | 6/1983 | Maplethorpe .......... | A63G 29/02 180/10 |
| 6,298,934 B1 | * | 10/2001 | Shteingold ............. | B62K 17/00 180/10 |
| 7,963,350 B1 | * | 6/2011 | Thielman .................. | F41H 7/02 180/7.1 |
| 9,481,414 B1 | * | 11/2016 | Thielman .................. | F41H 7/02 |

(Continued)

FOREIGN PATENT DOCUMENTS

| | | | | |
|---|---|---|---|---|
| CN | 106938683 B | * | 3/2018 | |
| GB | 2468501 A | * | 9/2010 | ............... F41H 7/02 |
| JP | 2003176998 A | * | 6/2003 | ............... F41H 7/02 |

*Primary Examiner* — Hilary L Gutman

(57) ABSTRACT

A school children rescue vehicle is provided. The vehicle includes an electric mobility scooter assembly. The vehicle includes a protective shell configured to attach to the assembly. The protective shell includes a plurality of hardened flat panels configured to connect between themselves and form an overall 5-sided shaped enclosure and arranged to fit on top of and connect to the electric mobility scooter assembly and structured to provide projectile protection for personnel situated within the protective shell. The shell includes a plurality of viewing ports of bullet proof glass positionable within the hardened flat panels and configured to provide line of sight viewing for personnel inside the protective shell. The overall external dimensions of the protective shell are such that the vehicle can maneuver within tight enclosed spaces. The vehicle functions as a deterrent to school violence and as a rescue vehicle for an active shooter situation.

19 Claims, 6 Drawing Sheets

(56) References Cited

U.S. PATENT DOCUMENTS

2007/0006724 A1* 1/2007 Strong ................. F41H 7/04
                                          89/36.08
2009/0120273 A1* 5/2009 Eckdahl ............... F41H 7/02
                                          89/1.1

* cited by examiner

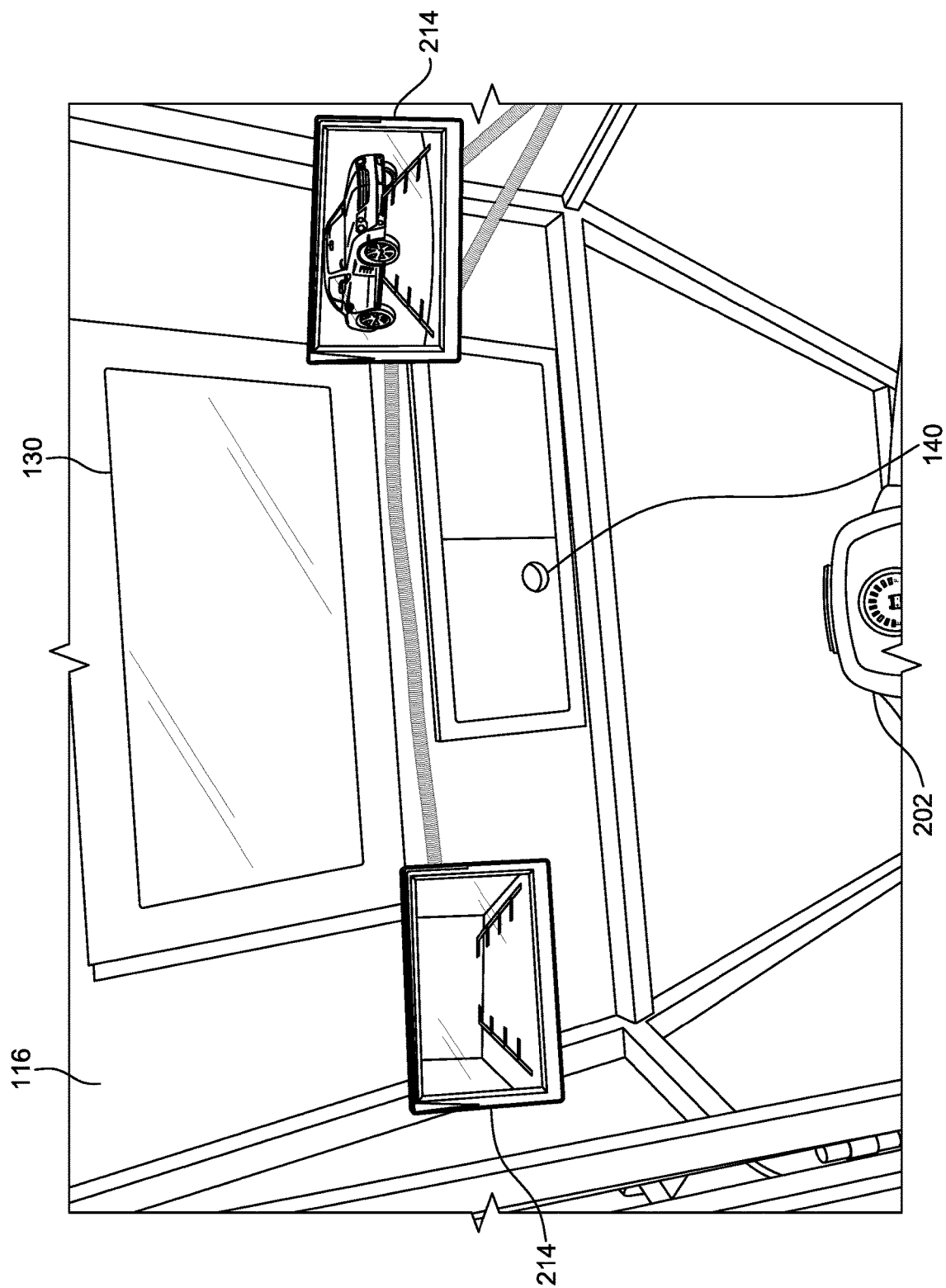

SCHOOL CHILDREN RESCUE VEHICLE

CROSS-REFERENCE TO RELATED APPLICATIONS

This application claims priority to provisional application 63/319,395 filed on Mar. 14, 2022, and is incorporated herein by reference in its entirety.

FIELD OF THE INVENTION

This invention relates to safety vehicles and more particularly to rescue vehicles for rescue, defensive, and offensive use in hazardous environments and for use in law enforcement evolutions requiring entry into narrow enclosed spaces such as schools in active shooter situations.

BACKGROUND

Armored vehicles are used to transport multiple passengers and cargo. Examples of uses include delivery of currency, military personnel and supplies, or explosives or other hazardous materials. Such vehicles are typically constructed upon a truck frame, and include thick metallic plating. The vehicles operate on streets or unpaved surfaces in an outdoor environment. These vehicles are typically very big and very heavy.

Many of these existing vehicles are cumbersome to use, costly, and do not provide proper protection for the law enforcement personnel when they need to enter restricted access spaces within a building. The current tanks or armored vehicles cannot enter these tight spaces.

Quite often police units, including local and state Special Weapons and Tactics (SWAT) units, and federal agencies such the Federal Bureau of Investigations (FBI) and Drug enforcement Agency (DEA) have the need to enter buildings with narrow passageways and stairs. Due to the potentially dangerous situations that the law enforcement personnel may find themselves in, protective gear and equipment is necessary in order to protect the law enforcement personnel.

Often, in situations such as an active shooter in a children's school, rapid entry into a building with narrow, confined spaces is necessary. Most often, quick entry is delayed because the safety of rescue personnel may be comprised if they enter without proper protection. In active shooter situations, the need to enter the school building as quickly as possible can determine how many survivors result from an active shooter situation. In such situations a school environment active shooter child rescue vehicle is needed. In many instances a School Children Rescue Vehicle (SCRV) may be needed in order to neutralize an active shooter situation as fast as possible and to save more children from harm.

The art described in this section is not intended to constitute an admission that any patent, publication or other information referred to herein is "prior art" with respect to this disclosure, unless specifically designated as such. In addition, this section should not be construed to mean that a search has been made or that no other pertinent information as defined in 37 CFR § 1.56(a) exists.

Accordingly, there is an established need for School Children Rescue Vehicles (SCRV) which solve at least one of the aforementioned problems. Further, there is an established need for School Children Rescue Vehicles which can be utilized more efficiently and effectively and provide law enforcement personnel a hardened vehicle which can enter tight spaces within a building, provide protection for the personnel and reduce safety hazards specifically within a school setting.

SUMMARY OF THE INVENTION

The present invention is directed to innovative and functional school children rescue vehicles for use in police tactical evolutions inside buildings with minimal travel clearances.

In an aspect of the present invention a School Children Rescue Vehicle comprising an enclosed body having a height between about 25 and about 75 inches, a length between about 24 and 72 inches, and a width between about 24 and 72 inches is provided. The School Children Rescue Vehicle includes at least two wheels at the base of the body, and possibly an alternate wheel or wheels which permit the vehicle to traverse irregular surfaces. The vehicle also includes rescue devices or weapons that can be attached to or be stored within the safety vehicle, and may pass through one or more openings in the body so that they may be controlled by the operator. The vehicle further includes openings which may be sealed to prevent passage of gas or toxins into the vehicle body. The vehicle also includes a body which is strengthened by plating or ballistics resistant materials to protect the occupant against attack.

In an aspect, a school children rescue vehicle is provided. The vehicle includes an electric mobility scooter assembly. The vehicle also includes a protective shell configured to attach to the electric mobility scooter assembly. The protective shell includes a plurality of hardened flat panels configured to connect between themselves and form an overall five-sided shaped enclosure and arranged to fit on top of and connect to the electric mobility scooter assembly and structured to provide projectile protection for personnel situated within the overall five-sided shaped enclosure. The shell also includes a plurality of viewing ports positionable within the plurality of hardened flat panels and configured to allow personnel within the overall five-sided shaped enclosure to have line of sight viewing of the spaces exterior to the overall five-sided shaped enclosure.

Further, the shell includes a plurality of protected penetrations positionable within the plurality of hardened flat panels and configured to allow personnel within the overall five-sided shaped enclosure to operate the protected penetrations to allow discharging firearms through the protected penetrations at objects external to the overall five-sided shaped enclosure. Additionally, the overall external dimensions of the protective shell are configured to allow the school children rescue vehicle to travel and maneuver within buildings having narrow corridors, doors, and other tight access ways. The shell also includes at least one doorway configured to allow an operator of the school children rescue vehicle to enter and leave the interior space of the protective shell. Further, the shell includes at least one hatch positionable on a top area of the protective shell configured to allow quick egress from within the interior space of the protective shell.

The protective shell includes an external width of no more than about 23.5 inches and designed to enter tight interior spaces. The vehicle also includes a plurality of sensors positionable on exterior surfaces of the protective shell and configured to transmit data to components within the protective shell and to remote components. Further, the vehicle includes a plurality of cameras positionable on the exterior surfaces of the protective shell and configured to transmit data to components within the protective shell and to remote components. Also, the vehicle includes a plurality of audible and visual annunciation and communication devices positionable on the exterior surfaces of the protective shell and designed to communicate visually and audibly to personnel exterior to the protective shell. And, the vehicle also includes at least one computer operated communications system configured to allow personnel within the protective shell to visually observe the camera data feed and to communicate with personnel exterior to the protective shell.

In embodiments, the vehicle includes side stability casters configured to prevent the vehicle from tipping over.

In embodiments, the stability casters extend horizontally away from an exterior of the protective shell to a distance of about 3½ inches.

In embodiments, the vehicle includes lights positionable on the exterior surfaces of the protective shell.

In embodiments, the plurality of hardened flat panels include Kevlar. In embodiments, the total weight of the protective shell is no greater than about 260 lbs.

In embodiments, the plurality of viewing ports include bullet proof glass. In embodiments, the bullet proof glass includes thicknesses of about 1 inch or about 1½ inches.

In embodiments, the plurality of protected penetrations include sliding protective panels configured to cover the plurality of protected penetrations when not in use and to allow access to the plurality of protected penetrations when a system user desires to have access to the penetration in order to discharge a firearm through the penetration from the interior of the protective shell to a target external to the protective shell.

In embodiments, the plurality of protected penetrations include penetrations of about 1¾ inch in diameter.

In embodiments, the at least one doorway is positioned on a left-hand side of the vehicle and has dimensions of about 23 inches wide and about 44 inches tall.

In embodiments, the protective shell includes metal plates of about 3/16-inch thickness on about a front side of the vehicle.

In embodiments, the protective shell includes metal plates of about ⅛-inch thickness on about a left side and a right side of the vehicle.

In embodiments, the protective shell includes metal plates of about ⅛-inch thickness on about a top of the vehicle.

In embodiments, the at least one hatch includes a width of about 24 inches and a length of about 20 inches.

In embodiments, the protective shell includes a front section, wherein the front section includes a lower vertical plate, an upper vertical plate, and an angled plate connecting the lower and vertical plates.

In embodiments, the vehicle includes comprising a speaker positioned on a top of the protective shell.

In embodiments, the protective shell includes a height from the floor of about 57 inches.

In embodiments, the protective shell includes an overall length of about 5 feet.

In embodiments, the vehicle can include a School Children Rescue Vehicle (SCRV) configured to allow an operator to sit inside the interior of the SCRV and control movement and auxiliary functions such as but not limited to firing weapons, deploying gases, gels, and/or other substances to an exterior of the SCRV to neutralize a suspect.

In embodiments, the SCRV can include overall width dimension of about 22 inches.

In embodiments, the SCRV can include light weight carbon nano fiber energy absorbing exterior panels, exterior components, and/or layers to protect the SCRV operator against bullets and/or explosives.

In embodiments, the SCRV can include a Kevlar exterior.

In embodiments, the SCRV can include compact battery packs designed for an on-station engagement of about 30 minutes.

In aspects, the SCRV can include bullet proof glass and/or synthetic see-through material on forward, side and/or back side viewing ports.

In embodiments, the SCRV can also include a four-wheel drive train.

In aspects of the present invention, the SCRV can include tri-wheel stair climbing drives configured on one, two, three, four, and/or a plurality of wheel axles structured to allow the SCRV to travel up and down stairs and other terrains which include elevation differences.

In embodiments, the SCRV can include replaceable tire assemblies on SCRV wheels configured to allow changing out tires bases on anticipated terrain, such as gravel, sand, mud, stairs, rocky surfaces, and/or concrete. Further, the tires can include treaded and/or smooth surfaces structured to operate within a plurality of tire pressures allowing the tires to conform to the terrain.

In embodiments, the SCRV can include battery pack charging outlets configured to allow charging of the SCRV batteries with 120V A/C and/or 220 V A/C.

In an embodiment of the present invention, the SCRV can include High Efficiency Particulate Air (HEPA) intake filtration configured to intake breathing air for the operator of the SCRV. Further, the SCRV can include air scrubbing equipment designed to chemically remove harmful gases from entering the interior of the SCRV. Further, the SCRV can include an air supply fan and/or pressurization system configured to ensure the interior compartment of the SCRV remains under positive pressure with respect to the exterior spaces of the SCRV thereby preventing outside air which could be contaminated from entering into the interior spaces of the SCRV.

In another embodiment of the present invention, the SCRV can also include an all-electric drive train structured to power the SCRV within enclosed spaces without the need for a combustion engine for control and movement of the SCRV.

In yet another embodiment, the SCRV can include battery packs located on a lower portion of the SCRV. The battery packs power the SCRV and are structured to provide a low center of gravity of the SCRV allowing the SCRV to operate on inclined and declined surfaces effectively and efficiently with stability.

In an aspect of the invention, the SCRV can be constructed such that transportation of the SCRV from a storage location to a place where the SCRV will be utilized can be carried out with a commercial wheelchair or commercial motorized scooter lift attached to a car.

In embodiments, the SCRV can include externally mounted cameras configured to allow the SCRV operator to observe full range of the exterior. Further, the cameras can include WIFI, Bluetooth, and/or other wireless transmission capability to allow personnel in an external command post to observe the environment of the SCRV.

In embodiments, the SCRV can be controlled externally without an operator inside the interior of the SCRV. Further, the SCRV can be controlled remotely such as a drone would be controlled from an external command location.

In embodiments, the SCRV can include a convex bullet proof dome configured for quick entry and exit of the SCRV by an operator.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 6 displays an forward looking internal view from within a protective shell in an embodiment of the present invention.

DETAILED DESCRIPTION

Figure 1:
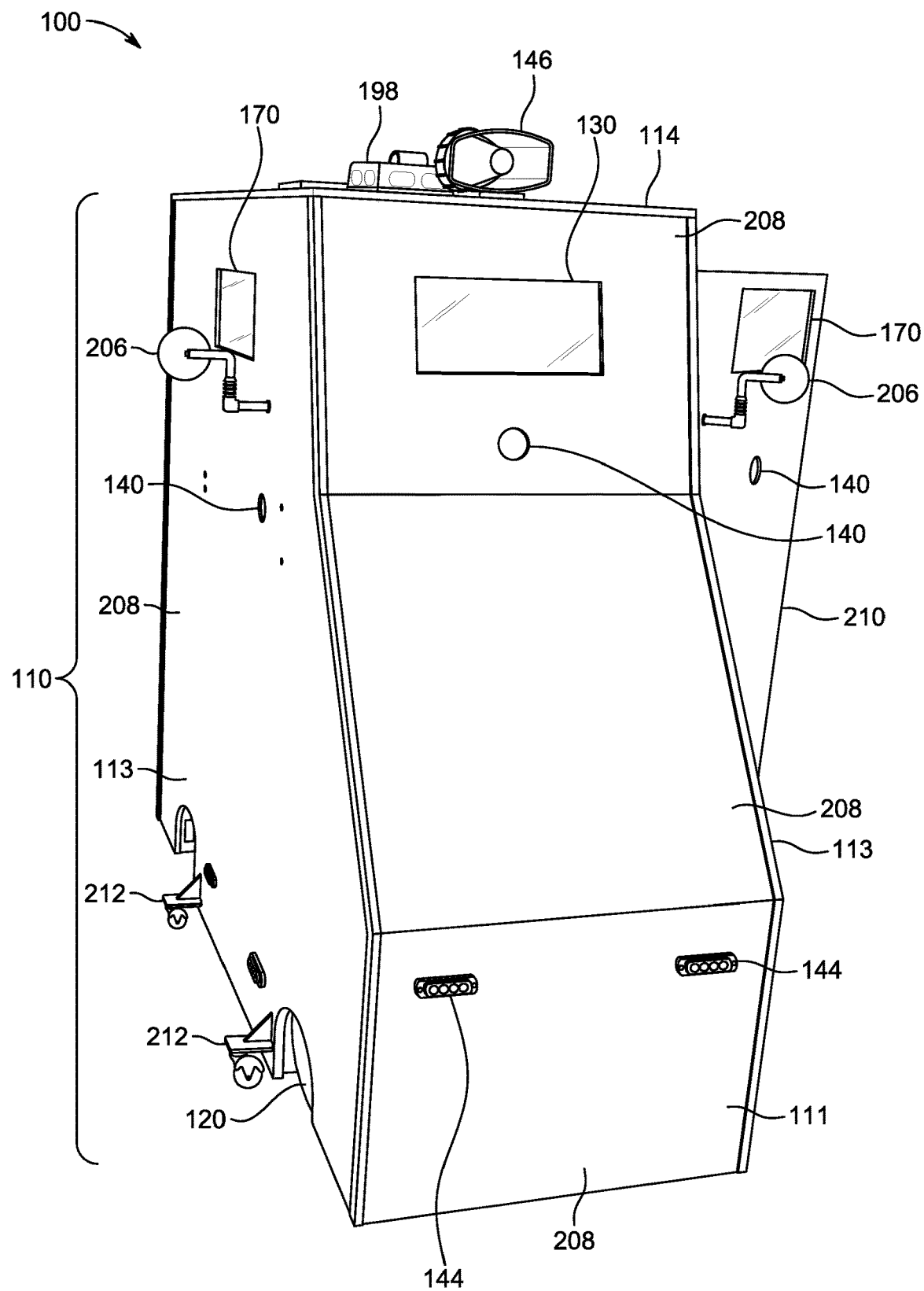
FIG. 1 illustrates a front right hand side perspective view of an embodiment of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

The following detailed description is exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to the FIGS. 1-6, School Children Rescue Vehicle (SCRV) 100 includes a protective shell, vehicular enclosure, frame, or body 110 defining a forward end 111, a rear end 112, at least two side ends 113, a top end 114, a base end 115, and an interior cabin 116. Body 110 is constructed to be of sufficient size to fully enclose at least one human operator of SCRV 100 and suitable to protect those enclosed in SCRV 100 from harmful, deleterious, or lethal attacks from firearms or explosive weaponry, such as poisonous gas, biohazards, fire, and or physical attacks such as ballistics, knife, and blunt weaponry. The dimensions of SCRV 110 are advantageously from about 22" to 24" wide by about 48" long by about 50" high. However, a width between about 18" to about 30", a length between about 24" to about 72", and a height between about 25" and about 75" have been found to be effective in accordance with the disclosure, based upon the intended application. Minimum dimension, however, may be as small as may house the intended operator, which may be human.

For example, SCRV 110 is built with narrow dimensions to advantageously permit an operator to safely traverse a narrow-enclosed space, such as a hallway or small room. These ranges of dimensions permit the SCRV to operate in small close quarters while still being capable of containing an operator. While alternative embodiments of SCRV 100 may be large enough to permit multiple operators to simultaneously occupy interior cabin 116, it is advantageous to maintain the smallest dimensions possible to maximize the maneuverability of SCRV 100. An example alternative embodiment, however, may feature a cabin of sufficient size for the operator to place an injured or rescued victim inside the SCRV. For rescue operations, the SCRV may be large enough to house multiple persons or operators. Body or protective shell 110 may be formed from one or more materials designed to resist damage from harmful or lethal attacks. This material may include one or more materials such as steel, titanium, or carbon fiber based composite materials, other metals, wood, fiberglass, or plastics in addition to projectile resistant material such as, but not limited to, Kevlar or Lexan. Additional embodiments of the invention may include layers of explosive or firearm resistant material attached to body 110. It is also advantageous for SCRV 100 to contain at least a partial coating of water or fluid resistant material attached to body 100.

Water or fluid resistant material is advantageous because at least some ballistic resistant material, such as, but not limited to, Kevlar may lose its ballistic resistant properties when moist or dampened. Positioned at base 115 are at least two or more wheels 120 for maneuvering SCRV 100 secured to the electric mobility scooter 202. Considering the compact size of SCRV 100, the present invention advantageously permits an operator to safely traverse a narrow-enclosed space, such as a hallway or small room normally inaccessible by larger vehicles.

This design offers advantages to law enforcement, security, rescue, and other personnel for a variety of applications including, but not limited to, apprehending and engaging dangerous criminals, defusing explosives, launching one or multiple smaller robotic drones or devices, or rescuing a victim from a dangerous environment, all while keeping the operator safe from attack.

Figure 2:
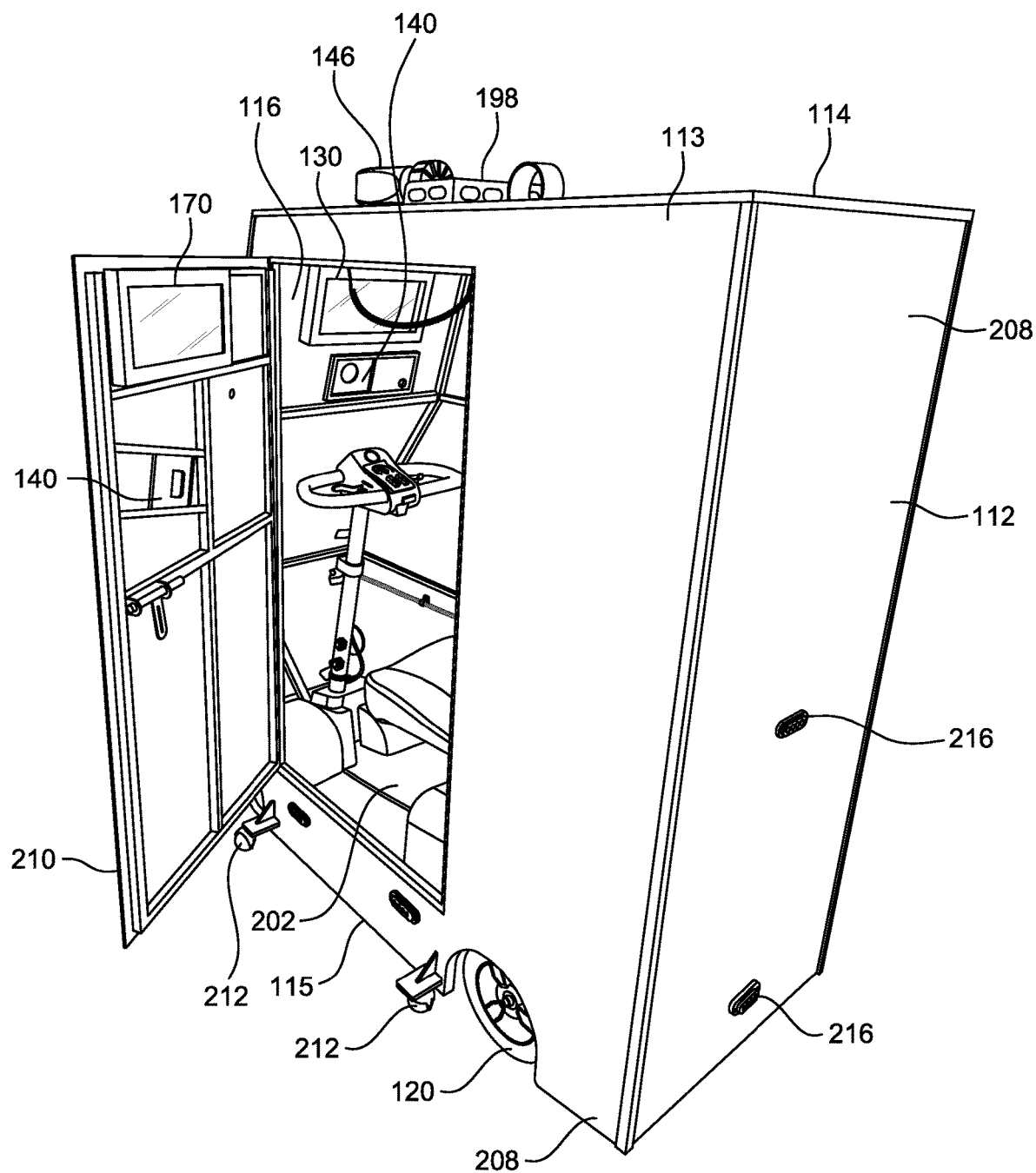
FIG. 2 illustrates a back left-hand side perspective view of an embodiment of the present invention.

FIGS. 1 and 2 further illustrate protective shell 110 having at least one viewing port 130 positioned at the forward end 111 of SCRV 100, although viewing ports may advantageously be positioned anywhere within body 110, based upon an intended application. Viewing port 130 may be manufactured from projectile and explosive resistant material, such as, but not limited to, polycarbonate thermal plastics layered with glass. Also positioned on the body or protective shell 110 are one or more weapons apertures or protected penetrations 140, optionally including access covers, designed to allow at least one weapon controlled by the operator to fire through the aperture or protected penetration 140. Example weapons may include lethal weapons, such as a firearm or explosive launcher, or non-lethal weapons, such as a taser gun or stun gun. As illustrated, apertures or protected penetrations 140 are positioned on the front end 111, however alternative embodiments may feature the apertures on other portions of the body 110 such as the side ends 113, the rear end 112, top end 114, or base end 115.

In order to optimally protect the operator, each weapons aperture 140 can be advantageously tightly sealable around weapon and weapon apertures or protected penetration 140 such that no outside gas or liquid can enter the passenger cabin 116 through the apertures or protected penetrations 140. This feature can be advantageous to protecting the passengers in the SCRV from dangerous gases, fumes, or poisons potentially present in a combat environment. One or more weapons may be attached or mounted to SCRV 100 or held by the operator. In addition to weapons being mounted on the interior of protective shell or body 110 or held by a person and projecting through a weapons aperture or protected penetration 140, additional weapons may be secured to the exterior of protective shell or body 110.

Additional elements attached to the protective shell or body 110 include one or more lights 144 for visually assisting the operator. As illustrated, lights 144 are head lights similar to those commonly used in automobiles, bicycles, and other vehicles. Possible types of headlights may include quartz-halogen or high power LED headlights, and positioned on the front end 111 of SCRV 100. The invention may further feature special feature lights such as black lights or UV lights commonly used for revealing crime scene evidence not normally visible to the naked human eye. Further illustrated are speakers 146 that advantageously allow an operator to communicate with individuals outside SCRV 100 while the operator remains safely in the SCRV. Additional embodiments on the invention advantageously feature attachments to the exterior of the protective shell or body 110.

In alternative embodiments, the SCRV may feature additional or alternative obstacle removing attachments such as a winch, saw, or jaws-of-life. In some embodiments, SCRV 100 will advantageously include additional detection devices or sensors 198 for detecting chemical, temperature, atmospheric, sound, radioactive, and or pressure.

These devices 198 are controlled by the operator through, for example, mechanical or electrical means. Devices 198 may, alternatively, be controlled remotely through a person other than the operator of SCRV 100.

FIG. 1. further illustrates that front end 111 for body or protective shell 110 is at least partially sloped to allow fluids, such as rainwater or fluid debris, to easily flow off of body 110, however additional embodiments may feature alternative slopes or angles in design.

The SCRV 100 is shown to have a protective shell 110 which can include hardened flat panels 208 connected between themselves to form an overall five-sided shaped enclosure and arranged to fit on top of and connect to the electric mobility scooter assembly 202. The SCRV 100 can include a front viewing port 130 and a protected penetration 140 positionable on a front side 111 of the protected shell 110. The SCRV 100 can also include mirrors 206 positionable on left- and right-hand sides of the SCRV 100. The SCRV 100 can include a door 210 positionable on a left-hand side of the SCRV 100 and configured for an operator to enter and exit the SCRV 100. The SCRV 100 can include lights 144 positionable on a front side 111 of the SCRV 100. Further, the SCRV 100 can include side stability casters 212 positionable on left- and right-hand sides of the SCRV 100 and configured to provide stability and to prevent the SCRV 100 from tipping over during maneuvering.

Reduced noise pollution is particularly beneficial should the SCRV 100 be used in a covert operation. An electrical motor is also advantageous to propulsion systems that produce exhaust, which may be a disadvantage in the close, enclosed spaces that SCRV 100 is designed to operate in. However, alternative embodiments of SCRV 100 may feature an internal combustion engine or other propulsion systems for powering and propelling SCRV 100.

A portion of in the interior 116 may also advantageously be used as storage space for tools, weapons, and other items to be transported or used by the passengers. Interior 116 may also house climate control features, such as air conditioning or heating units. It should be appreciated that other areas of the SCRV 100 may be used for storage space, or housing mechanical or electrical components of SCRV 100, however it is advantageous to utilize interior 116 for these purposes as interior 116 may be manufactured for reinforced protection, in addition to the simplicity and convenience of housing several mechanical and electrical components in a common enclosure. In addition to front viewing port 130, the invention further advantageously features at least one side viewing port 170 to allow an expanded viewing range by the operator.

The SCRV 100 can also include sensors 198 and speakers 144 positionable on an exterior of the SCRV 100.

As best seen in FIG. 2, the SCRV 100 can include a door 210 positionable on a left-hand side of the SCRV 100 and also includes hardened flat panels 208 which are included in the protective shell 110 of the SCRV 100. As shown in FIG. 2 the protective shell 110 of the SCRV 100 can be connected to the electric mobility scooter assembly 202 and configured to provide projectile protection for personnel situated within the interior 116 of the SCRV 100. The door 210 can include a protected penetration 140 and a side viewing port 170 inherent in the door and configured such that a system user can engage with penetration 140 and have visibility out of viewing port 170 while seated on the electric mobility scooter assembly 202. The tires 120 of the SCRV provide mobility of the SCRV 100.

Figure 3:
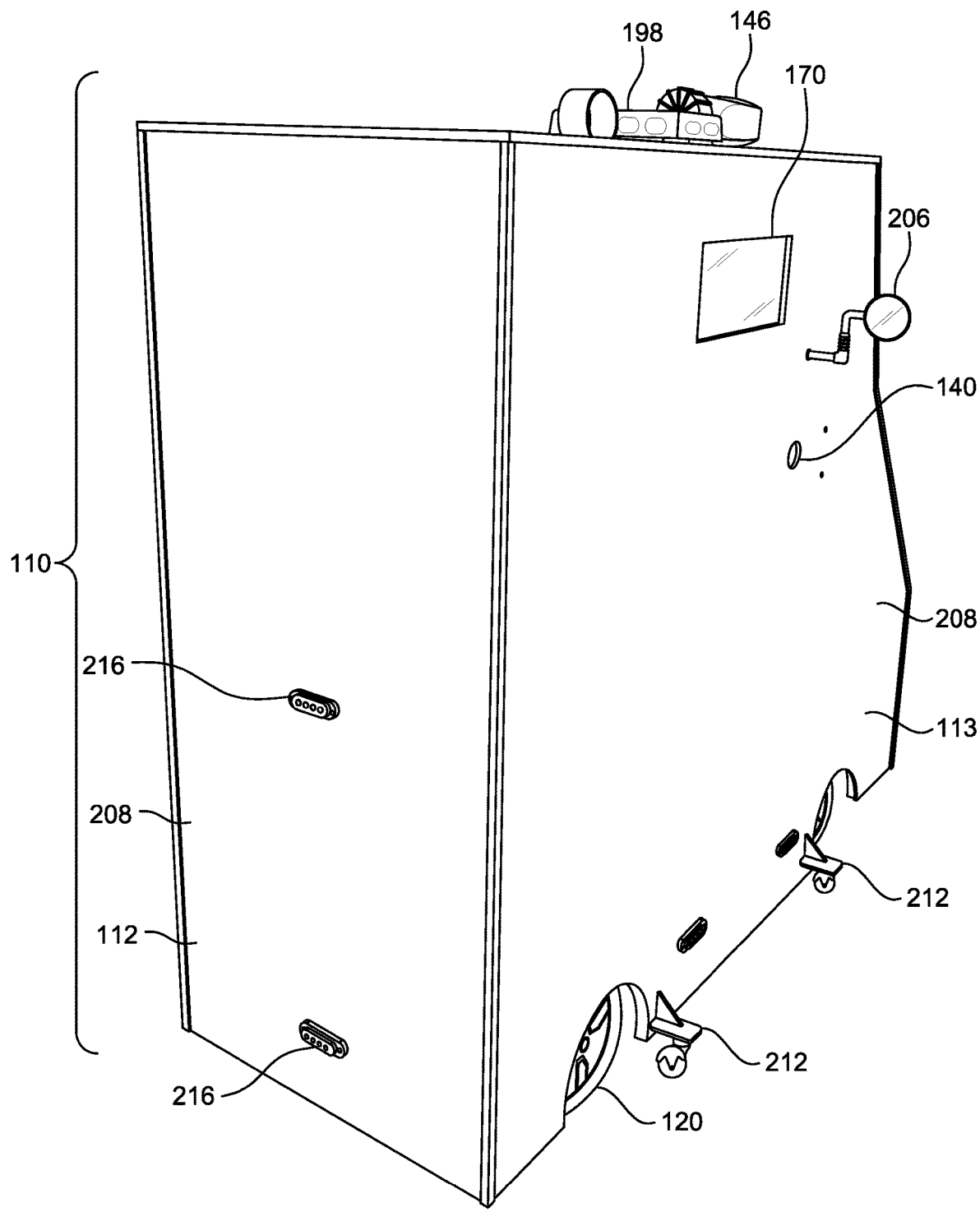
FIG. 3 presents a back right-hand side perspective view of an embodiment of the present invention.

FIG. 3 shows a back right-hand side perspective view of a SCRV 100 and highlights the protective shell 100 of the SCRV 100 and how it includes a plurality of hardened flat panels 208 connected together to form an overall 5-sided shaped enclosure. The SCRV 100 can include a viewing port 170 and a protected penetration 140 positionable on a right-hand side of the SCRV 100. Also as seen in FIG. 2, the SCRV can include speakers 146 and sensors 198 positionable on an exterior of the SCRV 100 and configured to interact with the external environment to the SCRV 100. The SCRV 100 can also include a side view mirror 206 on a right-hand side of the SCRV and can provide additional visual information for a user of the SCRV from within the interior 116 of the SCRV 100. The SCRV 100 can also have cameras 216 positionable on the exterior of the SCRV 100 to transmit video images to the computer operated communication system 214.

Figure 4:
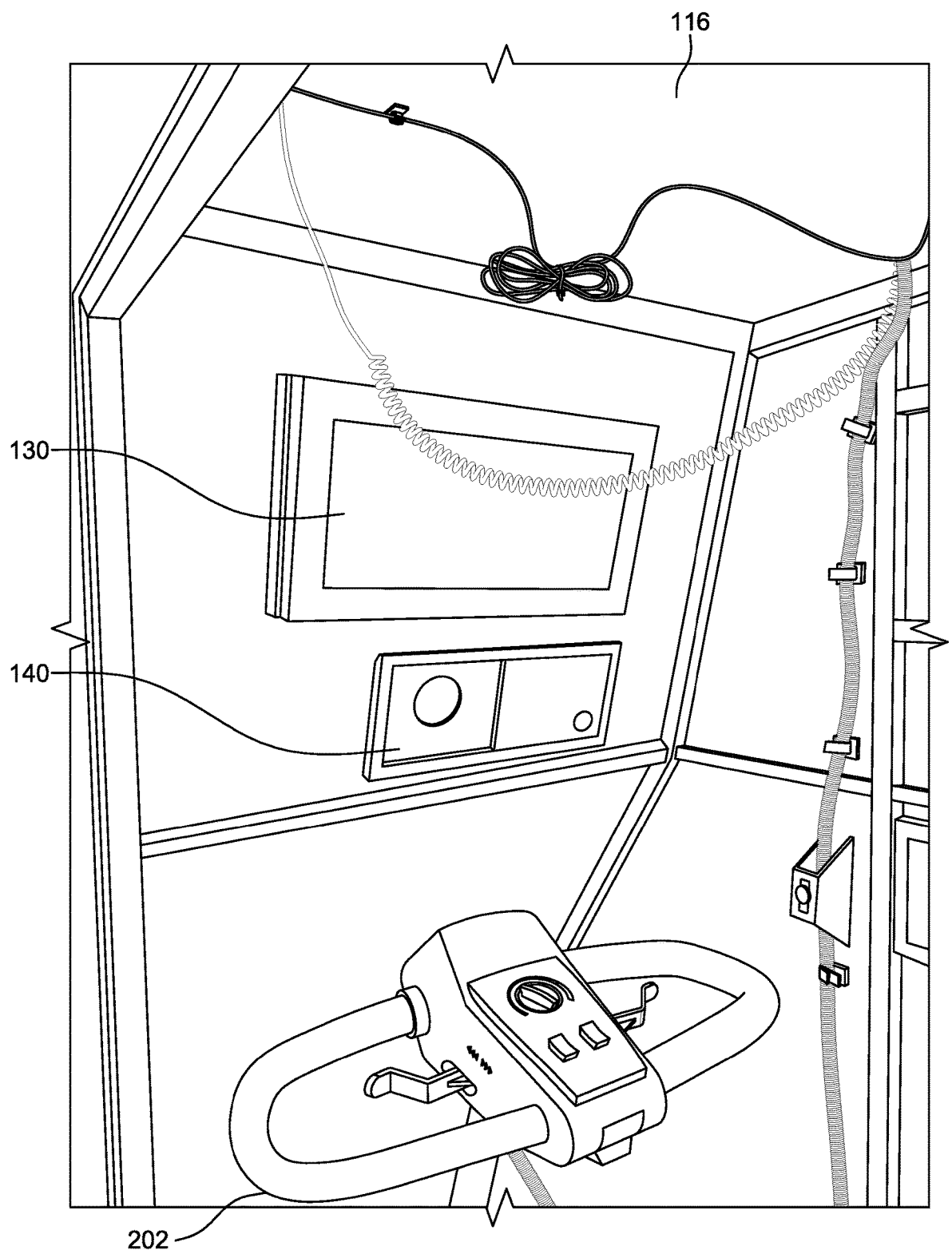
FIG. 4. presents forward looking internal view of an inside of a school children rescue vehicle in an embodiment of the present invention.

FIG. 4 shows an inside view of the interior 116 of the protective shell 110 of the SCRV 100. Within the interior 116 a system user can maneuver the SCRV 100 with the electric mobility scooter assembly 202. The system user has access to a front viewing port 130 and a front protected penetration 140.

Figure 5:
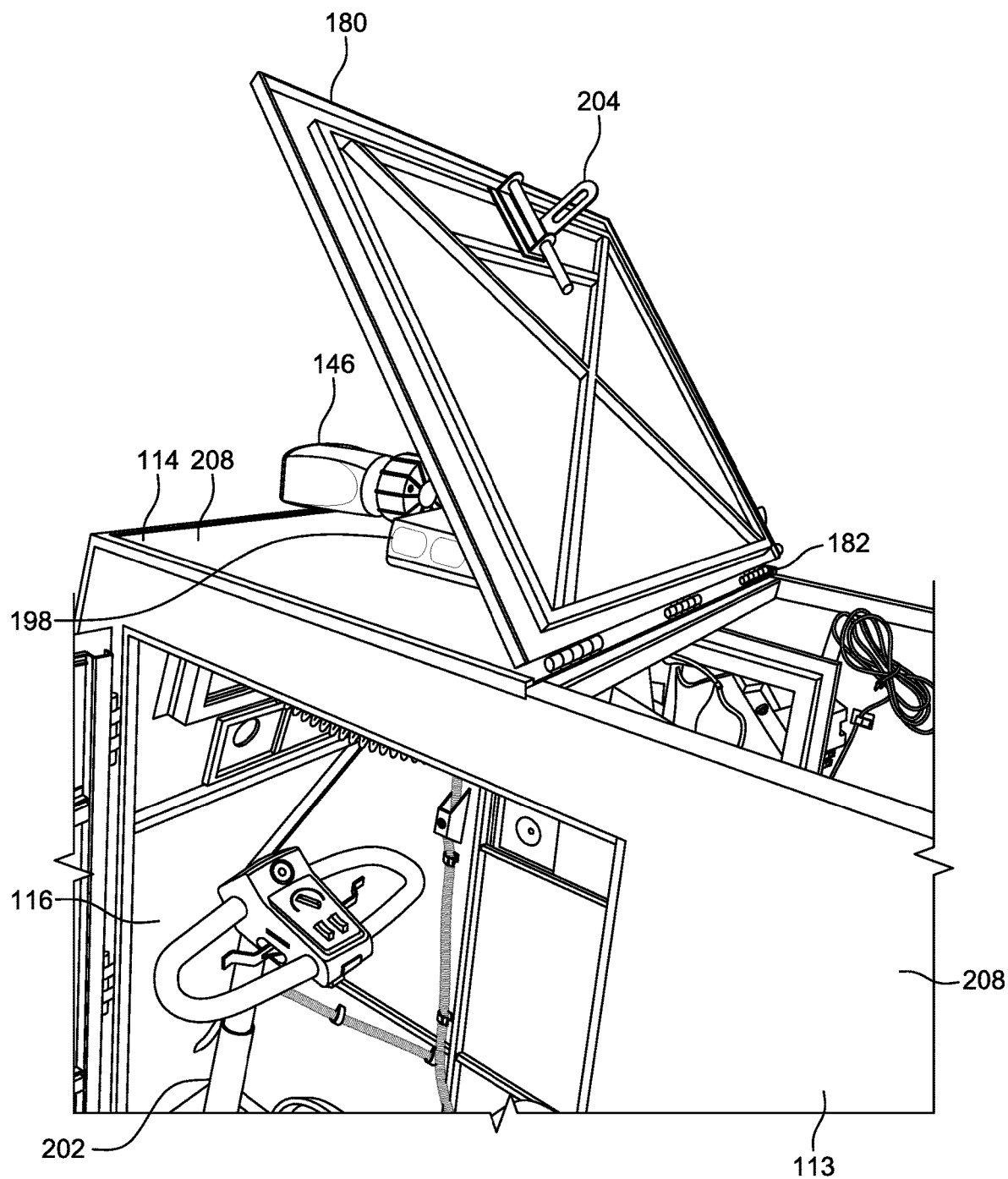
FIG. 5 displays a top left hand side view of an embodiment of the present invention showing an open hatch on a top side.

Referring now to FIG. 5 The operator may enter or exit SCRV 100 through a hatch 180 positioned on the top end 114 of body or protective shell 110. As illustrated, hatch 180 is connected to body or protective shell 110 through at least one hinge 182 and is secured to body 110 through a locking mechanism 204. Hatch 180 may include sealants, such as a rubber lining, to prevent dangerous gasses or poisons from entering the cabin 116 while the hatch is in a closed position. In order to facilitate a pressurized cabin or interior 116, SCRV 100 may further feature, for example, a self-contained air supply or resalable apertures. The top 114 and side 113 of the protective shell 110 can include hardened flat panels 208 to protect personnel situated within the interior 116 of the SCRV 100.

FIG. 6 displays a front internal view of the interior 116 of the protective shell 110. Within the protective shell 110 computer operated communications systems 214 can allow the system operator to interact with external sensors 198 and cameras 216 in order to properly conduct threat assessments.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the disclosure.

All references cited herein are expressly incorporated by reference in their entirety. In addition, unless mention was made above to the contrary, it should be noted that all of the accompanying drawings are not to scale. There are many different features to the present disclosure, and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

Insofar as the description above and the accompanying drawings disclose any additional subject matter that is not within the scope of the claims below, the inventions are not dedicated to the public and the right to file one or more applications to claim such additional inventions is reserved.

While the foregoing written description of the exemplary embodiments enables one of ordinary skill to make and use what is considered presently to be the best mode thereof, those of ordinary skill will understand and appreciate the existence of variations, combinations, and equivalents of the specific embodiment, method, and examples herein. The exemplary embodiments should therefore not be limited by the above-described embodiment, method and examples, but all embodiments and methods within the scope and spirit of the exemplary embodiments as claimed.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the method (and components of the individual operating components of the method) may not be described in detail.

Furthermore, the connecting lines, or connectors shown in the various figures presented are intended to represent exemplary functional relationships and/or physical or logical couplings between the various elements. It should be noted that many alternative or additional functional relationships, physical connections or logical connections might be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

The present invention has been described with reference to the preferred embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

What is claimed is:

1. A school children rescue vehicle comprising:
   an electric mobility scooter assembly;
   a protective shell configured to attach to the electric mobility scooter assembly,
      wherein the protective shell includes,
      a plurality of hardened flat panels configured to connect between themselves and form an overall five-sided shaped enclosure and arranged to fit on top of and connect to the electric mobility scooter assembly and structured to provide projectile protection for personnel situated within the overall five-sided shaped enclosure;
      a plurality of viewing ports positionable within the plurality of hardened flat panels and configured to allow personnel within the overall five-sided shaped enclosure to have line of sight viewing of the spaces exterior to the overall five-sided shaped enclosure;
      a plurality of protected penetrations positionable within the plurality of hardened flat panels and configured to allow personnel within the overall five-sided shaped enclosure to operate the protected penetrations to allow discharging firearms through the protected penetrations at objects external to the overall five-sided shaped enclosure; and wherein the overall external dimensions of the protective shell are configured to allow the school children rescue vehicle to travel and maneuver within buildings having narrow corridors, doors, and other tight access ways;

at least one doorway configured to allow an operator of the school children rescue vehicle to enter and leave the interior space of the protective shell;

at least one hatch positionable on a top area of the protective shell configured to allow quick egress from within the interior space of the protective shell, and wherein the protective shell comprises an external width of no more than about 23.5 inches and designed to enter tight interior spaces;

a plurality of sensors positionable on exterior surfaces of the protective shell and configured to transmit data to components within the protective shell and to remote components;

a plurality of cameras positionable on the exterior surfaces of the protective shell and configured to transmit data to components within the protective shell and to remote components;

a plurality of audible and visual annunciation and communication devices positionable on the exterior surfaces of the protective shell and designed to communicate visually and audibly to personnel exterior to the protective shell; and at least one computer operated communications system configured to allow personnel within the protective shell to visually observe the camera data feed and to communicate with personnel exterior to the protective shell.

2. The vehicle as recited in claim 1 further comprising side stability casters configured to prevent the vehicle from tipping over.

3. The stability casters as recited in claim 2 wherein the stability casters extend horizontally away from an exterior of the protective shell to a distance of about 3½ inches.

4. The vehicle as recited in claim 1 further comprising lights positionable on the exterior surfaces of the protective shell.

5. The vehicle as recited in claim 1 wherein the plurality of hardened flat panels include a projectile resistant material.

6. The vehicle as recited in claim 1 wherein the total weight of the protective shell is no greater than about 260 lbs.

7. The vehicle as recited in claim 1 wherein the plurality of viewing ports include bullet proof glass.

8. The bullet proof glass as recited in claim 7 wherein the bullet proof glass includes thicknesses of about 1 inch.

9. The bullet proof glass as recited in claim 7 wherein the bullet proof glass includes thicknesses of about 1½ inches.

10. The vehicle as recited in claim 1 wherein the plurality of protected penetrations include penetrations of about 1¾ inch in diameter.

11. The vehicle as recited in claim 1 wherein the at least one doorway is positioned on a left-hand side of the vehicle and has dimensions of about 23 inches wide and about 44 inches tall.

12. The vehicle as recited in claim 1 wherein the protective shell includes metal plates of about 3/16-inch thickness on about a front side of the vehicle.

13. The vehicle as recited in claim 1 wherein the protective shell includes metal plates of about ⅛-inch thickness on about a left side and a right side of the vehicle.

14. The vehicle as recited in claim 1 where in the protective shell includes metal plates of about ⅛-inch thickness on about a top of the vehicle.

15. The vehicle as recited in claim 1 wherein the at least one hatch includes a width of about 24 inches and a length of about 20 inches.

16. The vehicle as recited in claim 1 wherein the protective shell includes a front section, wherein the front section includes a lower vertical plate, an upper vertical plate, and an angled plate connecting the lower and vertical plates.

17. The vehicle as recited in claim 1 further comprising a speaker positioned on a top of the protective shell.

18. The vehicle as recited in claim 1 wherein the protective shell includes a height from the floor of about 57 inches.

19. The vehicle as recited in claim 1 wherein the protective shell includes an overall length of about 5 feet.

* * * * *